(No Model.) 2 Sheets—Sheet 2.
T. GILL.
GAS REFLECTOR.
No. 518,598. Patented Apr. 24, 1894.
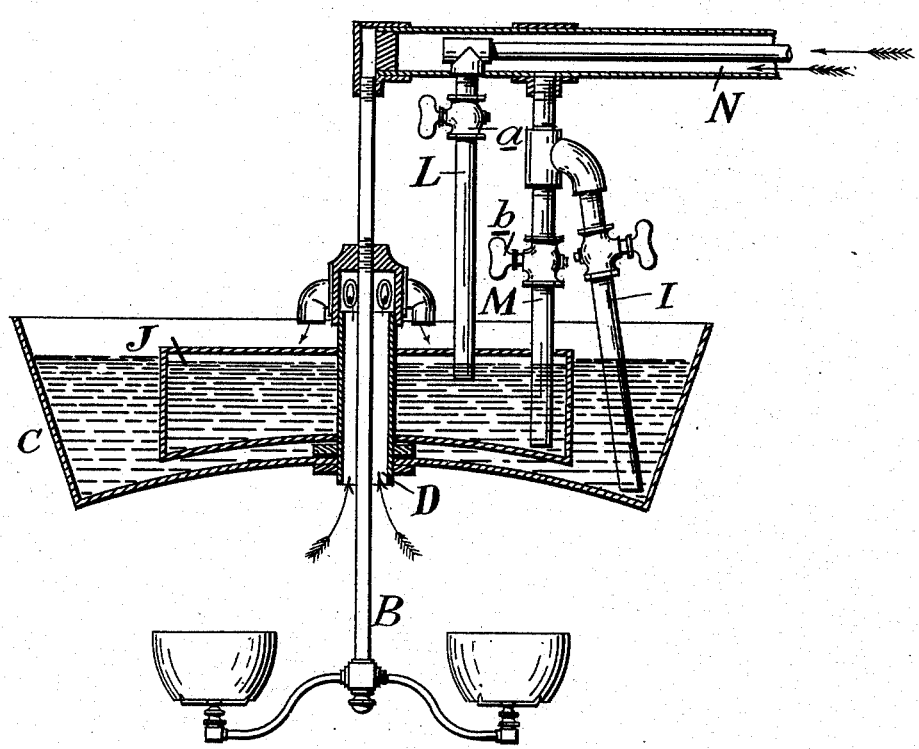
WITNESSES:
Arthur B Crossley
William H. Tempert
INVENTOR:
Thomas Gill.

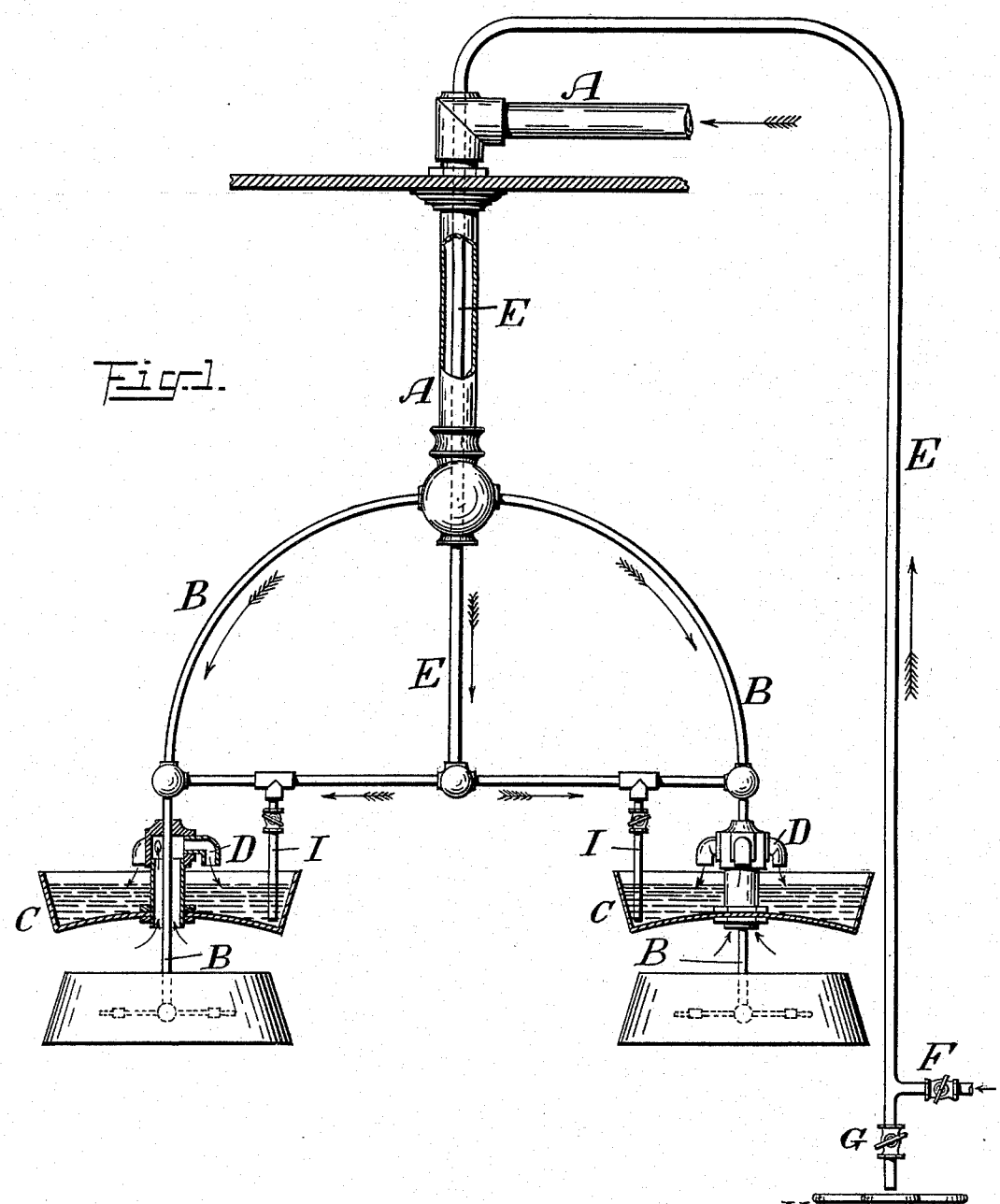

UNITED STATES PATENT OFFICE.

THOMAS GILL, OF CLECKHEATON, ENGLAND.

GAS-REFLECTOR.

SPECIFICATION forming part of Letters Patent No. 518,598, dated April 24, 1894.

Application filed December 11, 1893. Serial No. 493,369. (No model.)

*To all whom it may concern:*

Be it known that I, THOMAS GILL, a subject of the Queen of Great Britain, residing at Cleckheaton, in the county of York, England, have invented certain new and useful Improvements in Gas-Reflectors; and I do hereby declare the following to be a full, clear, and exact description of the invention, such as will enable others skilled in the art to which it appertains to make and use the same.

My invention consists in constructing a gas light reflector so that in addition to reflecting the light it absorbs the heat given off by the gas.

Such being the nature and object of my invention I will now proceed to describe the same more fully, and for that purpose make reference to the accompanying sheets of drawings illustrative thereof, wherein—

Figure 1 is an elevation partly in section of the mechanism I employ for carrying out my invention.

A is a gas pendant or chandelier, the gas to supply the same being fed through pipes A and B.

For absorbing the noxious vapors arising from spent gases and also for cooling the atmosphere surrounding the flames of gas I employ a hollow or dish shaped reflector C connected to the bottom of a funnel D which in turn is connected to the gas pipe B. This reflector C is supplied with cold water from the main or other convenient source, through pipe E which on its way passes through the vertical gas pipe A for the sake of convenience. The reflectors are suitably painted or enameled for the purpose of throwing light downward but the water contained in the said reflectors absorbs the heat and keeps the parts cool, consequently a room is prevented from getting overheated.

D is a funnel which I may or may not use. This funnel D will cause an updraft and draw up smoke or fumes which pass out as indicated by arrows and impinge directly upon the water in the reflector.

In order to change the water from the reflectors as the water becomes impure the inlet tap F is closed so as to shut off the supply of water, and afterward tap G is opened whereby pipe E will act as a vacuum tube and employ the reflectors up through dip pipes I, the foul water passing into the urinal basin H or into other suitable places.

A modification of my improvement is shown at Fig. 2 where inside the reflector C I place an inclosed vessel J for containing cold water which is made to constantly circulate through it for the purpose of cooling the water in the outer vessel C. The supply of water to the circulating vessel J passes down pipe L and the pressure of it forces the said water up through the pipe M and along the outer pipe N into a suitable vessel or cistern, and this circulation of water continues at the option of those in charge of it. The water from the vessel C is removed from time to time by the siphon pipe I as previously explained with regard to Fig. 1, but to do this the taps $a$ and $b$ would have to be closed.

I claim as my invention—

1. The combination with a gas pendant, of a water pan supported over the gas burners, and provided with a reflector on its bottom; a water pipe extending to near the bottom of the pan and provided with an extension piece forming a siphon, and a supply valve, and an outlet valve, both connected to the said pipe, substantially as set forth.

2. The combination, with a gas pendant, of a water pan supported over the gas burners, and provided with a reflector on its bottom; a funnel for removing noxious vapors, secured around the gas pipe and provided with bend pipes directing the vapors onto the water in the pan; a water pipe extending to near the bottom of the pan and provided with an extension piece forming a siphon, and a supply valve, and an outlet valve, both connected to the said pipe, substantially as set forth.

3. The combination, with a gas pendant, of a water pan supported over the gas burners, and provided with a reflector on its bottom; a water pipe extending to near the bottom of the pan and provided with an extension piece forming a siphon; an airtight vessel supported in the water pan, water circulating pipes connected to the said vessel and provided with stop valves; and a supply valve, and an outlet valve, both connected to the said water pipe, substantially as set forth.

In testimony whereof I affix my signature in presence of two witnesses.

THOMAS GILL.

Witnesses:
ARTHUR B. CROSSLEY,
WILLIAM H. TEMPEST,
*Both of Commercial Street, Halifax.*